United States Patent [19]
Fischer

[11] Patent Number: 5,870,476
[45] Date of Patent: Feb. 9, 1999

[54] PROCESS FOR PLEDGING DATA FOR A SECURE DATA EXCHANGE PROTOCOL

[75] Inventor: Jean-Bernard Fischer, Rennes, France

[73] Assignee: Thomson multimedia S.A., Courbevoie, France

[21] Appl. No.: 702,353

[22] Filed: Aug. 23, 1996

[51] Int. Cl.$^6$ ................................................ H04L 9/00
[52] U.S. Cl. ............................. 380/24; 380/9; 380/23; 380/25; 380/30; 380/46; 380/49; 705/35; 705/39
[58] Field of Search .................. 380/6, 9, 23, 24, 380/25, 28, 30, 43, 46, 49, 50, 59; 395/235, 237, 238, 239, 242, 244; 705/26, 27, 35, 37, 38, 39, 44

[56] References Cited

U.S. PATENT DOCUMENTS 4,774,664  9/1988  Campbell et al. ..................... 380/24 X

FOREIGN PATENT DOCUMENTS 4234165  3/1994  Germany .

OTHER PUBLICATIONS

IBM Technical Disclosure Bulletin, vol. 23, No. 78, Dec. 1980 New York, USA pp. 3325–3327 XP002004302 Anonymous: Packetprint for Electronic Signature or Message Authentication,.

Globecom Tokyo '87, IEEE/IECE Global Telecommunications Conf. 1987. Conf. Record (Cat. #87CH2520–5), Tokyo, Japan, 15–18 Nov. 1987, 1987 New York, NY USA, pp. 1439–1443 vol. 3, Tokura, N et al. "A broadband subscriber network usign optical bar star couplers".

Advances in Cryptology– Crypto '93, 13TH Annual Int'l Cryptology Conf. Proceedings, 1993 Santa Barbara, CA Aug. 22–26, 1993, ISBN 3-540-57766-1, 1984, Berlin, Germany, Springer–Verlag, Germany pp. 40–48 Taylor, R. "An integrity check value algorithm for stream ciphers".

*Primary Examiner*—Bernarr E. Gregory
*Attorney, Agent, or Firm*—Joseph S. Tripoli; Frederick A. Wein

[57] ABSTRACT

The process comprises a "pledging" step in which a debtor party transmits to a creditor party a data item which is the image of a pledged data item, and a "commencement" step in which the debtor party transmits the plain pledged data item to the creditor party who can verify pledge consistency. In the pledging step, the debtor party produces a seed applied to a pseudo-random generator to produce a pseudo-random word, combines this pseudo-random word in a one-to-one and reversible manner with the pledged data item to produce a checkword, and transmits the checkword to the creditor party. In the commencement step, the debtor party transmits to the creditor party the seed together with the plain pledged data item. The creditor party then applies the seed to a pseudo-random generator similar to that of the debtor party to produce another pseudo-random word, combines in the same one-to-one and reversible manner as for the debtor party, this other pseudo-random word with the checkword, to produce a check data item, and checks the consistency of the check data item with the plain pledged data item received from the debtor party.

2 Claims, 1 Drawing Sheet

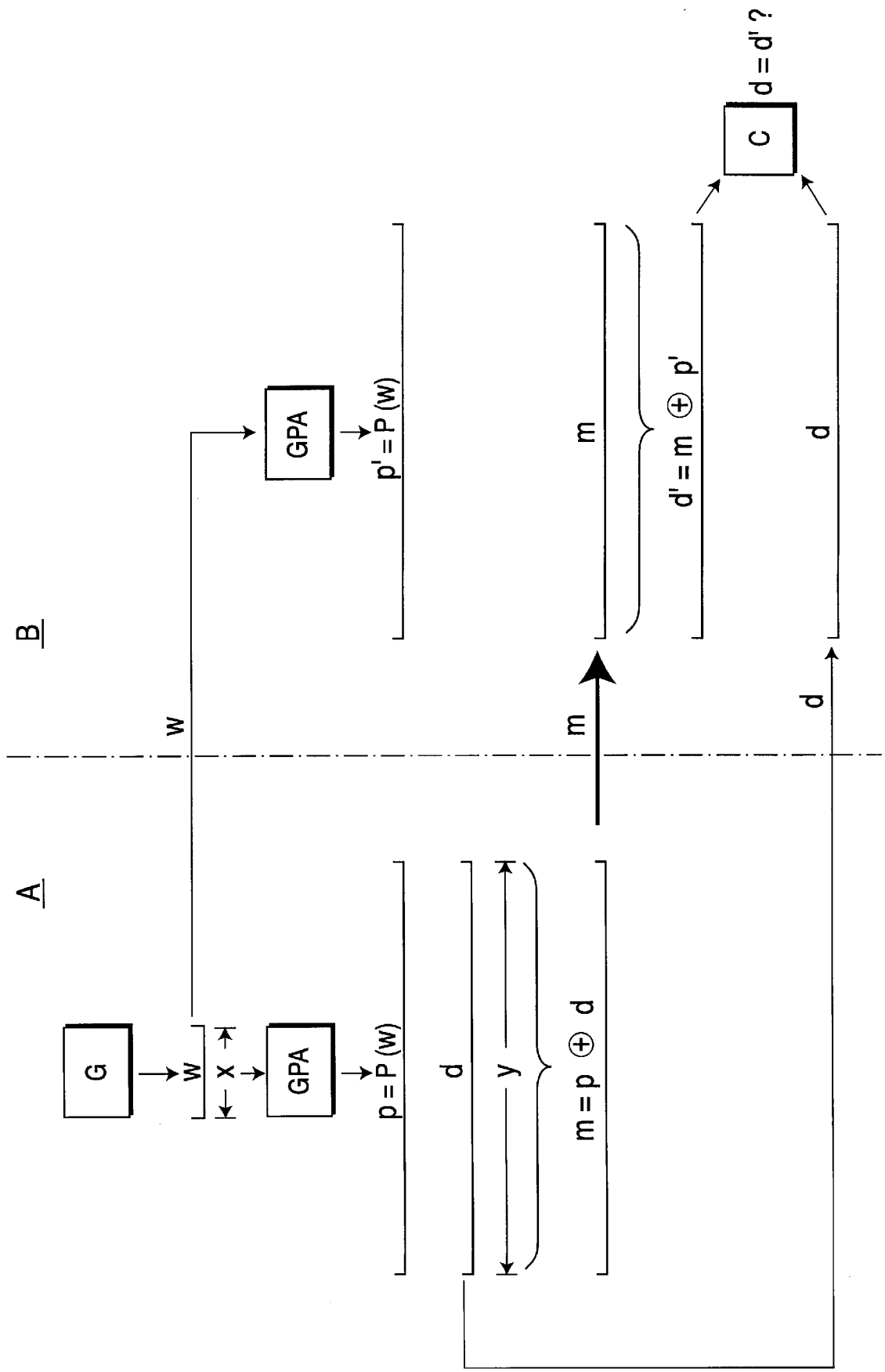

PROCESS FOR PLEDGING DATA FOR A SECURE DATA EXCHANGE PROTOCOL

BACKGROUND

The invention relates to a process for pledging data for a secure data-exchange protocol.

The invention applies especially, advantageously, to physical and logical access control systems, for example in computer networks or checking systems such as those found for example in decoders for conditional-access television (pay television, encoded television, etc.). Of course, these applications are in no sense limiting and are given here merely by way of examples of technical fields in which the invention may be used.

The principle of pledging a data item consists, for a first party, in committing a predetermined data item to another party but without communicating this data item in clear. During a subsequent step, the first party reveals the plain data item to the second party, the latter having the possibility of verifying at this time that the plain data item is indeed that which had been secretly pledged beforehand.

Here and in what follows it will be noted that the term "party" relates equally to moral or physical persons as to electronic or computer systems exchanging data between themselves in an entirely automatic manner in the framework of a particular protocol, or, more generally, of a given transaction.

Similarly, the data item forming the subject of the transaction will be referred to as the "pledged data item", the party who initially holds the pledged data item (the "first party" indicated above) will be referred to as the "debtor" and the party for whom the pledged data item is intended (the "second party" indicated above) will be referred to as the "creditor".

SUMMARY OF THE INVENTION

Such a pledging protocol involves several constraints:

firstly, the pledged data item must remain secret to the creditor (and likewise to third parties) until the appropriate time, for example until the conclusion of work carried out together or the completion of a secure data exchange between the two parties;

it is indispensable that the debtor should not be able to renege or cheat, for example by revealing to the creditor a data item other than that which had been pledged initially.

Such pledging processes have already been proposed. They generally use cryptographic hash functions such as the DES in CBC mode. An exposition of these functions together with examples of their implementation will be found in B. Preneel and coll., "Cryptographically Secure Hash Functions: an Overview", R. C. Merkle, "One-Way Hash Functions and DES", LNCS, 435, Springer Verlag (1990), pp. 428–446 or G. J. Simmons, Contemporary Cryptology, IEEE Press, Chap. 6: Digital Signature.

One of the drawbacks of these functions stems from the fact that they require considerable memory resources and considerable computational power, which drawback may be prohibitive when it is desired to implement the process together with configurations of restricted dimensions, such as those of microcontrollers and microcircuits of smart cards.

To remedy this difficulty, the present invention proposes a process for pledging data which uses appreciably fewer memory and computational resources, thus advantageously enabling it to be implemented by the microcircuits or microcontrollers of straightforward smart cards.

This process is of the aforesaid known type, that is to say comprising:

a "pledging" step, in which a debtor party, the holder of a pledged data item, exchanges information with a creditor party in such a way as to transmit to the latter a data item which is the image of the pledged data item, representing the latter in a one-to-one but non-reversible manner, a "commencement" step, in which the debtor party exchanges information with the creditor party in such a way as to transmit to the latter the plain pledged data item or in a manner enabling it to be retrieved, and in which the creditor party can verify the consistency of this pledged data item with that of the pledging step.

According to the invention, it is characterized in that:

in the pledging step, the debtor party:

produces a seed applied to a pseudo-random generator in such a way as to produce a pseudo-random word, combines this pseudo-random word in a one-to-one and reversible manner with the pledged data item, in such a way as to produce a checkword, and transmits the checkword to the creditor party, in the commencement step the debtor party transmits to the creditor party the seed together with the plain pledged data item, and the creditor party, on receiving the seed and the pledged data item:

applies the seed to a pseudo-random generator similar to that of the debtor party, in such a way as to produce another pseudo-random word, combines, in the same one-to-one and reversible manner as for the debtor party, this other pseudo-random word with the checkword, in such a way as to produce a check data item, and checks the consistency of the check data item with the plain pledged data item received from the debtor party.

In an advantageous embodiment the pseudo-random word and other word which are produced by the respective pseudo-random generators of the debtor and creditor parties are words of the same length as the pledged data item, and the said one-to-one and reversible combining operations are EXCLUSIVE ORs.

Other characteristics and advantages will emerge on reading the detailed description below of an example of the implementation of the invention.

BRIEF DESCRIPTION OF THE DRAWING(S)

The single figure illustrates schematically the various operations and data exchanges performed in order to implement the process of the invention.

It is supposed that a first party A (the debtor) is obliged to commit a data item d to a second party B (the creditor), this data item having to remain temporarily secret, for example until the conclusion of work together or the completion of a transaction between the two parties.

The protocol proceeds essentially in two steps:

the "pledging": the debtor A, who possesses the data item d which he desires to pledge with the creditor B, exchanges messages with the latter so that, at the end of this step, the creditor B holds an information item (which will be designated m in what follows) representing d in a one-to-one manner but not enabling this data item d to be retrieved by itself (in probabilistic terms, this amounts to saying that B must not be able to infer d from m with a probability better than 1/n, n being the value of a security parameter);

the "commencement" the debtor A reveals in clear the data item d to the creditor B, and B must be able to assure himself that the data item transmitted to him in this step is indeed the same as that which had been secretly pledged in the previous step (in probabilistic terms, this amounts to saying that, if the debtor A attempts to cheat by revealing a value other than that pledged, it must be discoverable with a probability of at least 1−1/n).

Essentially, the process of the present invention is based on the use of a pseudo-random generator, that is to say a function which, for any input word referred to as the "seed", produces as output a word of greater length. The output word is produced in a deterministic manner but it is pseudo-random, that is to say that, knowing the initial bits of the word, it is virtually impossible to discover the next bit without knowing the seed, and, conversely, it is at least as difficult to discover the seed on the basis of the output word.

DESCRIPTION OF THE PREFERRED EMBODIMENT(S)

Stated otherwise, the pseudo-random generator must be difficult to invert, other than by requiring computational power and/or time which are prohibitive given the envisaged application, and especially the customary transaction times.

A "cellular automaton" such as that described in S. Wolfram, "Cryptography with Cellular Automata", Advances in Cryptology: Proc. Crypto '85, Lecture Notes in Computer Science, 218 (1986), pp. 429–432, can in particular be used to embody this pseudo-random generator.

The implementation of such a cellular automaton in the framework of the invention will be described below; such an embodiment is, however, given merely by way of example and has no limiting character.

As illustrated in the figure, each of the parties A and B involved in the process possesses such a pseudo-random generator referenced PRG, the two generators working in accordance with the same algorithm The debtor A has, additionally, a random generator G. Each of the parties A and B is furthermore furnished with means making it possible to carry out a bit-by-bit EXCLUSIVE OR function, denoted "$\oplus$" in what follows.

Finally, the creditor party B possesses bit-by-bit comparison means C making it possible to determine the identity between two words applied as input (the agreement of these words attesting to the absence of data falsification by the debtor during the transaction).

The procedure runs as follows: as indicated above, it proceeds in two steps, namely "pledging" and "commencement".

Pledging begins by obtaining, on the debtor party A side, a random word w produced by the generator G.

This word w is applied as seed to the pseudo-random generator PRG, which then produces, in accordance with its algorithm, a pseudo-random string p=P(w), of the same length as the data item d required to be pledged between the parties A and B.

A then calculates m=p$\oplus$d, that is to say operates an EXCLUSIVE OR between p and d (which are two data items of the same length), and transmits the resulting data item m to the creditor party B.

It will be noted that the data item m is a one-to-one enciphered representation of the data item d, but that the latter is completely hidden insofar as it is not possible to determine the string p produced by the pseudo-random generator: this is a property of an EXCLUSIVE ORing combination, likewise known as a "one-time pad process"). Stated otherwise, encipherment by applying the EXCLUSIVE OR is as safe as the pseudo-random generator, that is to say that an outside observer (the party B or a third party) cannot, from m, infer the data item d with a probability better than that which he would have of inferring p without knowing the seed w of the pseudo-random generator.

The word m having been pledged with B, the parties A and B can now continue the protocol embarked on, by operating the desired transaction between themselves, carrying out the planned work together, etc.

Once this operational phase is completed, it is possible to go to the commencement step.

The debtor A then discloses to the creditor, in clear, the data item d pledged as well as the seed w which had served to encipher this data item at the start of the pledging step.

Party B then calculates by means of his own pseudo-random generator a data item p'=P(w) (normally with p=p' if A has indeed transmitted the true seed to B). With the enciphered data item m which had been pledged and which he had retained, party B then calculates, via an EXCLUSIVE OR function, d'=m$\oplus$p' and verifies that d'=d, this testifying that all of the operations are running properly: thus, if everything has run correctly, we should have d'=m$\oplus$p'=(p$\oplus$d)$\oplus$p=p$\oplus$p$\oplus$d=d.

It may be remarked that, as compared with a conventional hash function, the protocol according to the invention requires a larger number of transmissions (since not only is it required to transmit the enciphered data item m, but also the plain data item d and the seed w). Thus, with a conventional hash function, the pledging would have been operated on a value of 64 or 128 bits whereas, in the present case, if for example the length of the data item d is 10,000 bits, it is necessary to transmit at least 10,000 bits; the invention is therefore particularly suited to cases (in practice the most frequent ones) in which the data item is of modest size, typically less than 1,000 bits long.

In terms of memory resources required, the process of the invention is, on the other hand, particularly advantageous as compared with a conventional hash function; thus, in the latter case, it would have been necessary to aggregate a number of bits corresponding to the required size of block to be hashed (typically 64 or 128 bits) and, in the case in which the data item were longer,—which is often very desirable from the security point of view—it is necessary to retain in random-access memory at least the new block and the result of the previous hash operation, namely 128 to 256 bits. Against this, with the process of the present invention it suffices to transmit the bits in blocks, which may be as small as desired, with correspondingly reduced memory resource requirements. It is even possible, in the extreme case, to transmit the data bit by bit, and hence without needing intermediate storage.

As regards the security of the protocol, it will be shown that this is excellent, and in fact depends only on the quality of the pseudo-random generator chosen and on the length of the pledged data item.

Let x be the length in bits of the seed of the pseudo-random generator and y that of the data item.

From the point of view of B, the only solution in order to "crack" the protocol is to obtain indications about the seed or about the word output by the pseudo-random generator. However, the seed is produced randomly and it is kept secret until commencement. The only means B has is therefore to try all the possible seeds systematically; if he can do this, he will be able to find a viable solution by verifying the validity of the data items thus produced.

The seed must therefore be fairly long so as to preclude exhaustive attack, hence a lower limit of 264 possible seeds may be fixed.

From the point of view of A, the attraction of a fraud is linked with the possibility of finding attractive matches. This means that having a false data item $\delta$ which A wishes to pass off as the pledged data item d, he has to find an $\omega$ such that:

$$d \oplus P(w) = \delta \oplus P(\omega),$$

which amounts to finding $P(\omega) = d \oplus P(w) \oplus \omega$, and hence in finding a seed corresponding to a given output from the pseudo-random generator. However, this problem is made difficult owing to the intrinsic properties of pseudo-random generators.

Nevertheless, it should be noted that if the length of the output word is less than that of the input word, the number of matches for a given output is greater than 1 and hence such a match has every chance of existing.

Another very important remark is that A has plenty of time, before the transaction, to prepare his fraud and find an attractive match, whereas B generally has very limited time (the time for the transaction).

Therefore, the chances of success of A must be minimized. Thus, it may be remarked that if for example a minimum of $2^{64}$ possible seeds is retained, A can reckon with probably $2^{32}$ tries before finding a match, this being easily feasible, and hence insufficiently safe (by virtue of the birthdays paradox).

However, if the output word is of length y greater than the length x of the seed, the probability that a given word can be produced by the generator is only $\frac{1}{2}^{y-x}$, namely, for example $\frac{1}{2}^{32}$ if y=96 and x=64. This means that A will have to try $2^{32}$ different values of $\delta$ to find one which is generated by the pseudo-random generator, this making in total approximately $2^{32+32} = 2^{64}$ tries of pairs ($\delta$, $\omega$), which in practice is unachievable.

The following minimum dimensions can therefore be imposed as the order of magnitude for x and y:

length x of the seed>60 bits;

length y of the pledged data item>100 bits (though it may entail introducing redundancy).

EXAMPLE

Let us consider a pseudo-random generator based on a cellular automaton and composed of a circulating register with n sites $s_i$, with $0 < i \leq n$. This register evolves by applying the change of state function: $s_i = S_{i+1} \oplus (s_i \lor S_{i-1})$ to each site $s_i$. Each time round, the generator is deployed and the value of the site $s_1$ is "output". Initialization of the generator consists in giving a value to each site. Hence, the seed is of length n. It will be noted that if k bits are required at output, 2.n.k elementary operations are required.

This generator is safe since it relies on an "NP problem" (see the above-cited article by S. Wolfram), and the number of different strings generated is of the order of $2^n$.

As regards dimensionings, the data item is 256 bits long and the register is composed of 61 sites. This gives of the order of $2^{61}$ possible outputs (referred to as paddings), and the probability that a given string of 256 bits corresponds to a seed is $2^{-195}$, namely 1 chance in $10^{58}$.

Calculation of the pledging calls for 32,000 elementary operations, as does verification also.

I claim:

1. A process for pledging data for a secure data-exchange protocol, of the type comprising:

a pledging step, in which a debtor party, the holder of a pledged data item, exchanges information with a creditor party to transmit to the creditor party a data item which is the image of the pledged data item, representing the pledged data item in a one-to-one but non-reversible manner, a commencement step where the debtor party exchanges information with the creditor party to transmit to the creditor party the plain pledged data item or in a manner enabling the plain pledged data item to be retrieved, and in which the creditor party can verify the consistency of the pledged data item with that of the pledging step, in the pledging step, the debtor party:

produces a seed applied to a pseudo-random generator in such a way as to produce a pseudo-random word, combines this pseudo-random word in a one-to-one and reversible manner with the pledged data item, to produce a checkword, and transmits the checkword to the creditor party, in the commencement step, the debtor party transmits to the creditor party a seed together with the plain pledged data item, and the creditor party, upon receiving the seed and the pledged data item:

applies the seed to a pseudo-random generator similar to that of the debtor party, to produce another pseudo-random word, combines, in the one-to-one and reversible manner as for the debtor party, another pseudo-random word with the checkword, to produce a check data item, and checks the consistency of the check data item with the plain pledged data item received from the debtor party.

2. The process for pledging data of claim 1, wherein the pseudo-random word and the other pseudo-random word which are produced by the respective pseudo-random generators of the debtor and creditor parties, are words of the same length as the pledged data item, and the one-to-one and reversible combining operations are provided by exclusive OR circuits.

* * * * *